(12) United States Patent
Wang et al.

(10) Patent No.: US 10,898,985 B2
(45) Date of Patent: Jan. 26, 2021

(54) POWER TOOL

(71) Applicant: Nanjing Chervon Industry Co., Ltd., Nanjing (CN)

(72) Inventors: Hongwei Wang, Nanjing (CN); Weipeng Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 16/855,234

(22) Filed: Apr. 22, 2020

(65) Prior Publication Data

US 2020/0282508 A1 Sep. 10, 2020

Related U.S. Application Data

(63) Continuation of application No. PCT/CN2018/098569, filed on Aug. 3, 2018.

(30) Foreign Application Priority Data

Nov. 24, 2017 (CN) .......................... 2017 1 1186846
Jun. 26, 2018 (CN) .......................... 2018 1 0665129
(Continued)

(51) Int. Cl.
*B24B 23/02* (2006.01)
*H02P 7/29* (2016.01)
*B25F 5/00* (2006.01)

(52) U.S. Cl.
CPC .............. *B24B 23/028* (2013.01); *H02P 7/29* (2013.01); *B25F 5/001* (2013.01)

(58) Field of Classification Search
CPC . B24B 23/028; H02P 7/29; H02P 1/00; H02P 1/04; H02P 1/12; H02P 1/14;
(Continued)

(56) References Cited

U.S. PATENT DOCUMENTS 3,064,175 A * 11/1962 Vergez, Jr. .............. H02P 7/066
388/831
4,218,730 A * 8/1980 Marumoto ............ H02M 3/156
363/124
(Continued)

FOREIGN PATENT DOCUMENTS

CN 102315806 A 1/2012
CN 202806425 U 3/2013
(Continued)

OTHER PUBLICATIONS

ISA/CN, International Search Report issued on application No. PCT/CN2018/098569, dated Nov. 5, 2018, 3 pages.

*Primary Examiner* — George B Nguyen
(74) *Attorney, Agent, or Firm* — Greenberg Traurig, LLP

(57) ABSTRACT

A power tool includes a direct current (DC) unit, a motor, a driving circuit, a capacitor circuit, and a control unit. The capacitor circuit includes a switching element and a capacitor. The control unit drives the switching element to realize the control of charging or discharging of the capacitor. The capacitor circuit is connected between the DC unit and the driving circuit, and can buffer the impact on the power supply side of the power tool, making the power tool compact in structure.

15 Claims, 10 Drawing Sheets

(30) Foreign Application Priority Data

| Jun. 26, 2018 | (CN) | 2018 1 0665144 |
|---|---|---|
| Jun. 26, 2018 | (CN) | 2018 1 0665467 |
| Jun. 26, 2018 | (CN) | 2018 1 0665470 |
| Jun. 26, 2018 | (CN) | 2018 1 0673985 |

(58) Field of Classification Search
CPC ...... H02P 1/16; H02P 1/46; H02P 3/00; H02P 3/12; H02P 3/14; H02P 3/16; H02P 3/18; H02P 3/22; H02P 21/00; H02P 23/00; H02P 25/00; H02P 27/00; H02P 27/04; H02P 27/06; H02P 27/08; G05B 11/28
USPC .......................................................... 451/359
See application file for complete search history.

(56) References Cited

U.S. PATENT DOCUMENTS

| 4,841,207 | A | * | 6/1989 | Cheyne | H02P 6/06 318/139 |
|---|---|---|---|---|---|
| 5,617,016 | A | * | 4/1997 | Borghi | H02M 3/1563 323/284 |
| 5,923,145 | A | * | 7/1999 | Reichard | H02P 7/29 318/400.28 |
| 6,474,913 | B2 | * | 11/2002 | Katoh | B23Q 1/0009 408/1 R |
| 6,650,072 | B2 | * | 11/2003 | Harlan | H02P 6/10 318/400.2 |
| 6,796,475 | B2 | * | 9/2004 | Adams | B25C 1/06 227/129 |
| 6,949,006 | B1 | * | 9/2005 | Chen | B24B 21/04 318/268 |
| 7,489,856 | B2 | * | 2/2009 | Haller | B23Q 17/09 388/825 |
| 7,713,111 | B2 | * | 5/2010 | Layher | B24B 55/02 451/450 |
| 8,678,882 | B1 | * | 3/2014 | Huber | B24B 19/16 451/65 |
| 10,272,558 | B2 | * | 4/2019 | Christophersen | B24B 23/02 |
| 10,404,136 | B2 | * | 9/2019 | Oktavec | B24B 47/12 |
| 10,749,430 | B2 | * | 8/2020 | Gao | H02M 7/42 |
| 2004/0180606 | A1 | * | 9/2004 | Iwashita | H02P 5/52 451/5 |
| 2007/0292150 | A1 | * | 12/2007 | Lu | G03G 15/5004 399/34 |
| 2009/0071671 | A1 | * | 3/2009 | Zhong | B23B 45/008 173/176 |
| 2011/0171887 | A1 | * | 7/2011 | Tanimoto | B24B 47/12 451/359 |
| 2011/0284256 | A1 | * | 11/2011 | Iwata | B25F 5/00 173/176 |
| 2013/0069572 | A1 | * | 3/2013 | Maekawa | H02P 6/18 318/400.14 |
| 2013/0162187 | A1 | * | 6/2013 | Tsai | H02P 7/29 318/400.26 |
| 2014/0368139 | A1 | * | 12/2014 | Zhou | H02P 6/28 318/400.13 |
| 2015/0111480 | A1 | * | 4/2015 | Vanko | B24B 23/028 451/359 |
| 2015/0340950 | A1 | * | 11/2015 | Wibben | H02M 3/156 363/124 |
| 2015/0343594 | A1 | * | 12/2015 | Shinozaki | B24B 49/16 451/5 |
| 2016/0020443 | A1 | * | 1/2016 | White | H01M 10/4207 318/245 |
| 2017/0110935 | A1 | | 4/2017 | Oktavec et al. | |
| 2017/0246732 | A1 | * | 8/2017 | Dey, IV | G01D 5/2006 |
| 2017/0264163 | A1 | * | 9/2017 | Jenks | H02K 7/003 |
| 2017/0303354 | A1 | * | 10/2017 | Yau | H05B 45/37 |
| 2018/0290270 | A1 | * | 10/2018 | Manasseh | B23B 45/02 |

FOREIGN PATENT DOCUMENTS

| CN | 204290718 U | 4/2015 |
|---|---|---|
| CN | 107294438 A | 10/2017 |
| EP | 1174998 A1 | 1/2002 |
| JP | 2003305667 A | 10/2003 |
| WO | 2016100891 A1 | 6/2016 |

* cited by examiner

POWER TOOL

TECHNICAL FIELD

The present disclosure relates to the technical field of power tools, and more particularly relates to a control circuitry for a power tool.

BACKGROUND

In order to meet the demand for stable output performance, existing power tools often adopt a large-capacitor design, which results in a large size of the power tool, making the power tool not convenient to carry and operate.

US patent application publication number US 20170110935 A1 discloses a capacitor circuit that uses a comparator to determine whether the DC (direct current) bus voltage collected by the sampling circuit has reached a threshold value, and in cases where the threshold value is reached, the capacitor would be controlled to discharge through a transistor. However, the charging process at power-on is not controlled. Because at the moment of power-on the power supply voltage cannot reach the comparator's threshold, the capacitor is still charged at a high current when powering up. At the moment of power-on, the power supply voltage will be directly applied to the two terminals of the capacitor, causing the capacitor to generate an instantaneous current, leading to an impact on the power supply.

To meet users' needs, there is a need to design a power tool capable of buffering the impact on the power supply side of the power tool.

SUMMARY

In order to solve the shortcomings of the related art, an object of the present disclosure is to provide a power tool that has a compact structure and can meet the requirements of user needs.

To achieve the above objective, the present disclosure adopts the following technical solutions.

There is provided a power tool that includes: a housing; a brushless motor that is arranged in the housing and that includes a stator and a rotor; a motor shaft driven by the rotor; a tool accessory shaft configured for supporting and driving a tool accessory; a transmission device configured for coupling the motor shaft to the tool accessory shaft; a driving circuit configured for outputting a on-off signal to drive the rotor of the brushless motor to operate; a control unit that outputs a driving signal to control the driving circuit; a direct current (DC) unit configured for supplying power to the brushless motor, the driving circuit, and the control unit; and a capacitor circuit connected in parallel between a positive electrode and a negative electrode of the DC unit. The capacitor circuit includes a capacitor C and a power switch transistor Q, which are connected in series. The control unit is also electrically connected to the power switch transistor Q, and is configured for outputting a pulse width modulation (PWM) duty cycle signal to control the power switch transistor Q to be turned on and off.

There is further provided a power tool that includes: a housing; a brushless motor that is arranged in the housing and that includes a stator and a rotor; a motor shaft driven by the rotor; a tool accessory shaft configured for supporting and driving a tool accessory; a transmission device configured for coupling the motor shaft to the tool accessory shaft; a driving circuit configured for outputting a on-off signal to drive the rotor of the brushless motor to operate; a control unit that outputs a driving signal to control the driving circuit; a direct current (DC) unit configured for supplying power to the brushless motor, the driving circuit, and the control unit; and a capacitor circuit connected in parallel between a positive electrode and a negative electrode of the DC unit. The capacitor circuit includes a capacitor C and a power switch transistor Q, which are connected in series. The control unit is also electrically connected to the power switch transistor Q, and is configured for outputting a pulse width modulation (PWM) duty cycle signal depending on the rotational speed of the brushless motor to control the power switch transistor Q to be turned on and off.

Optionally, in the above power tool, the control unit is configured to output a PWM duty signal to turn on the power switch transistor Q when a rotational speed of the brushless motor reaches a first rotational speed, so that the capacitor circuit is in a charging state.

Optionally, in the above power tool, the control unit is configured to output a PWM duty signal to turn off the power switch transistor Q when a rotational speed of the brushless motor reaches a second rotational speed, so that the capacitor circuit is in a discharging state, where the first rotational speed is less than the second rotational speed.

Optionally, in the above power tool, when the power switch transistor Q is turned off, the duty cycle of the PWM duty signal is gradually reduced.

Optionally, in the above power tool, the capacitor C is an electrolytic capacitor, and a ratio of a capacitance value of the electrolytic capacitor to a rated power of the brushless motor lies in the range of 20 µF/kW-80 µF/kW.

There is further provided an angle grinder that includes: a housing; a brushless motor that is arranged in the housing and that includes a stator and a rotor; a motor shaft driven by the rotor; a tool accessory shaft configured for supporting and driving a grinding disc; a transmission device configured for coupling the motor shaft to the tool accessory shaft; a driving circuit configured for outputting a on-off signal to drive the rotor of the brushless motor to operate; a control unit that outputs a driving signal to control the driving circuit; a direct current (DC) unit configured for supplying power to the brushless motor, the driving circuit, and the control unit; and a capacitor circuit connected in parallel between a positive electrode and a negative electrode of the DC unit. The capacitor circuit includes a capacitor C and a power switch transistor Q, which are connected in series. The control unit is also electrically connected to the power switch transistor Q, and is configured for outputting a pulse width modulation (PWM) duty cycle signal depending on the rotational speed of the brushless motor. When the rotational speed of the brushless motor reaches a first rotational speed, the control unit outputs a PWM duty cycle signal to control the power switch transistor Q to be turned on, so that the capacitor circuit enters a charging state.

Optionally, in the above angle grinder, the control unit is configured to output a PWM duty signal to turn off the power switch transistor Q when a rotational speed of the brushless motor reaches a second rotational speed, so that the capacitor circuit is in a discharging state, where the first rotational speed is less than the second rotational speed.

Optionally, in the above angle grinder, when the power switch transistor Q is turned on, the duty cycle of the PWM duty signal is gradually increased.

Optionally, in the above angle grinder, the capacitor C is an electrolytic capacitor, and a ratio of a capacitance value of the electrolytic capacitor to a rated power of the brushless motor lies in the range of 20 µF/kW-80 µf/kW.

The present disclosure further provides an angle grinder that includes: a motor including a stator and a rotor; a transmission device that is operably connected to the rotor and that outputs a power to drive a grinding disc; a driving circuit configured for outputting a on-off signal to drive the rotor of the motor to operate; a control unit configured for outputting a driving signal to control the driving circuit; a rectifier module configured for converting an alternating current (AC) electricity into a direct current (DC) electricity to power up the motor, the driving circuit, and the control unit; and a capacitor circuit connected between the rectifier module and the driving circuit. The capacitor circuit includes a capacitor C and a power switch transistor Q, which are connected in series. The control unit is also electrically connected to the power switch transistor Q, and is configured for outputting a pulse width modulation (PWM) duty cycle signal depending on the rotational speed of the motor to control the power switch transistor Q to be turned on. When the rotational speed of the motor reaches a first rotational speed, the control unit outputs a PWM duty cycle signal to control the power switch transistor Q to be turned on, so that the capacitor circuit enters a charging state.

Optionally, in the above angle grinder, when the power switch transistor Q is turned on, the duty cycle of the PWM duty signal is gradually increased.

Optionally, in the above angle grinder, the capacitor C is an electrolytic capacitor, and a ratio of a capacitance value of the electrolytic capacitor to a rated power of the motor lies in the range of 20 μf/kW~80 μF/kW.

The present disclosure further provides another electric tool that includes: a brushless motor including a stator and a rotor; a transmission device that is operably connected to the rotor and that outputs a power to drive a tool accessory; a driving circuit configured for outputting a on-off signal to drive the rotor of the brushless motor to operate; a control unit configured for outputting a driving signal to control the driving circuit; a direct current (DC) unit configured for supplying power to the brushless motor, the driving circuit, and the control unit; and a capacitor circuit in parallel between a positive electrode and a negative electrode of the DC unit. The capacitor circuit includes a capacitor C and a switching element, which are connected in series. The control unit is also electrically connected to the switching element, and is configured for outputting a pulse width modulation (PWM) duty cycle signal depending on the rotational speed of the brushless motor to control the switching element to be turned on. When the rotational speed of the brushless motor reaches a first rotational speed, the control unit outputs a PWM duty cycle signal to control the switching element to be turned on, so that the capacitor circuit enters a charging state.

Optionally, in the above power tool, the control unit is configured to output a PWM duty cycle signal to turn on the switching element when the rotational speed of the brushless motor reaches a first rotational speed so that the capacitor circuit enters a charging state, and output a PWM duty cycle signal to turn off the switching element when the rotational speed of the brushless motor reaches a second rotational speed so that the capacitor circuit enters a discharging state, where the first rotation speed is less than the second rotation speed.

Optionally, in the above power tool, the DC unit includes a rectifier module that is at least operative to connect to an alternating current (AC) power and that is configured to convert the AC power into a direct current (DC) power.

Optionally, in the above power tool, the capacitor circuit is connected between the rectifier module and the driving circuit.

There is further provided an angle grinder that includes: a housing; a brushless motor that is arranged in the housing and that includes a stator and a rotor; a motor shaft driven by the rotor; a tool accessory shaft configured for supporting and driving a grinding disc; a transmission device configured for coupling the motor shaft to the tool accessory shaft; a driving circuit configured for outputting a on-off signal to drive the rotor of the brushless motor to operate; a control unit that outputs a driving signal to control the driving circuit; a direct current (DC) unit configured for supplying power to the brushless motor, the driving circuit, and the control unit; and a capacitor circuit connected in parallel between a positive electrode and a negative electrode of the DC unit. The capacitor circuit includes a capacitor C and a power switch transistor Q, which are connected in series. The control unit is also electrically connected to the power switch transistor Q, and is configured for outputting a pulse width modulation (PWM) duty cycle signal depending on the rotational speed of the brushless motor. When the rotational speed of the brushless motor reaches a first rotational speed, the control unit outputs a PWM duty cycle signal to control the power switch transistor Q to be turned on, so that the capacitor circuit enters a charging state. When the rotational speed of the brushless motor reaches a second rotational speed, the control unit outputs a PWM duty cycle signal to turn off the power switch transistor Q, so that the capacitor enters a discharging state, where the first rotational speed is less than the second rotational speed.

Optionally, in the above angle grinder, when the power switch transistor Q is turned on, the duty cycle of the PWM duty signal is gradually increased.

Optionally, in the above angle grinder, when the power switch transistor Q is turned off, the duty cycle of the PWM duty signal is gradually reduced.

Optionally, in the above angle grinder, the capacitor C is an electrolytic capacitor, and a ratio of a capacitance value of the electrolytic capacitor to a rated power of the brushless motor lies in the range of 20 μF/kW-80 μf/kW.

The present disclosure further provides an angle grinder that includes: a motor including a stator and a rotor; a transmission device that is operably connected to the rotor and that outputs a power to drive a grinding disc; a driving circuit configured for outputting a on-off signal to drive the rotor of the motor to operate; a control unit that outputs a driving signal to control the driving circuit; a rectifier module configured to convert an alternating current (AC) into a direct current (DC) electricity to power up the motor, the driving circuit, and the control unit; a capacitor circuit that is connected between the rectifier module and the driving circuit. The capacitor circuit may include a capacitor C and a power switch transistor Q, which are connected in series. The control unit is also electrically connected to the power switch transistor Q, and is configured for outputting a pulse width modulation (PWM) duty cycle signal depending on the rotational speed of the motor. When the rotational speed of the motor reaches a first rotational speed, the control unit outputs a PWM duty cycle signal to control the power switch transistor Q to be turned on, so that the capacitor circuit enters a charging state. When the rotational speed of the motor reaches a second rotational speed, the control unit outputs a PWM duty cycle signal to turn off the power switch transistor Q, so that the capacitor enters a discharging state, where the second rotational speed is larger than the first rotational speed.

Optionally, in the above angle grinder, when the power switch transistor Q is turned off, the duty cycle of the PWM duty signal is gradually reduced.

Optionally, in the above angle grinder, the capacitor C is an electrolytic capacitor, and a ratio of a capacitance value of the electrolytic capacitor to a rated power of the motor lies in the range of 20 μF/kW-80 μF/kW.

The present disclosure further provides another electric tool that includes: a brushless motor including a stator and a rotor; a transmission device that is operably connected to the rotor and that outputs a power to drive a tool accessory; a driving circuit configured for outputting a on-off signal to drive the rotor of the brushless motor to operate; a control unit configured for outputting a driving signal to control the driving circuit; a direct current (DC) unit configured for supplying power to the brushless motor, the driving circuit, and the control unit; and a capacitor circuit in parallel between a positive electrode and a negative electrode of the DC unit. The capacitor circuit may include a capacitor C and a switching element, which are connected in series. The control unit is also electrically connected to the switching element, and is configured for outputting a pulse width modulation (PWM) duty cycle signal to control the switching element to be turned on or off depending on the rotational speed of the brushless motor. When the rotational speed of the brushless motor reaches a first rotational speed, the control unit outputs a PWM duty cycle signal to control the switching element to be turned on, so that the capacitor circuit enters a charging state. When the rotational speed of the brushless motor reaches a second rotational speed, the control unit outputs a PWM duty cycle signal to turn off the switching element, so that the capacitor enters a discharging state, where the first rotational speed is less than the second rotational speed.

Optionally, in the above power tool, the control unit is configured to output a PWM duty cycle signal depending on the rotational speed of the brushless motor to control the switching element to be turned on and off. When the rotational speed of the brushless motor reaches a first rotational speed, the control unit outputs a PWM duty cycle signal to turn on a switching element, so that the capacitor circuit enters a charging state.

Optionally, in the above power tool, the DC unit includes a rectifier module that is at least operative to connect to an alternating current (AC) power and that is configured to convert the AC power into a direct current (DC) power.

Optionally, in the above power tool, the capacitor circuit is connected between the rectifier module and the driving circuit.

The present disclosure is beneficial in that it can buffer the impact on the power supply side of the power tool by controlling the charging or discharging process of the capacitor.

DETAILED DESCRIPTION

The present disclosure will now be described in greater detail in connection with the accompanying drawings and specific examples.

Figure 1:
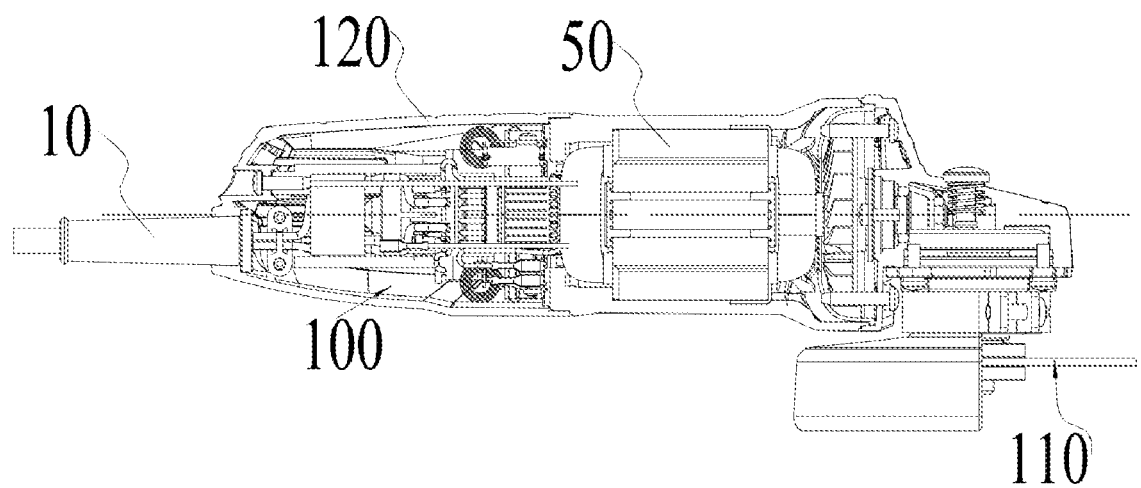
FIG. 1 is a schematic diagram illustrating a mechanical structure of an angle grinder in accordance with a first example provided by the present disclosure.
Figure 2:
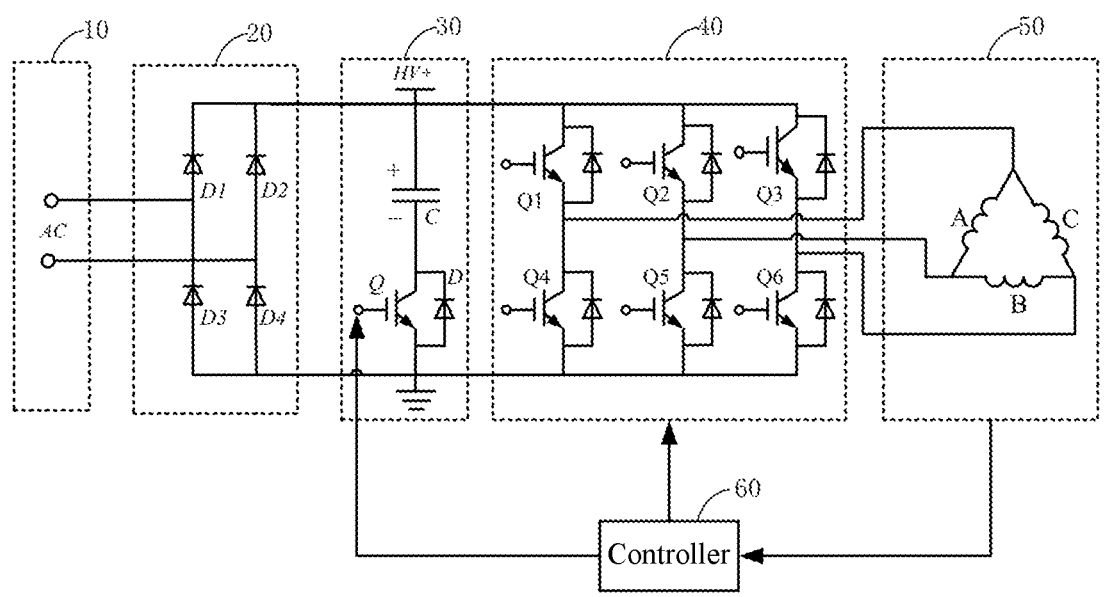
FIG. 2 is a circuit block diagram of an angle grinder in accordance with the first example provided by the present disclosure.

In a first example of the present disclosure, reference is made to the mechanical structure of the angle grinder illustrated in FIG. 1 and the circuit structure of the angle grinder illustrated in FIG. 2. The angle grinder 100 mainly includes a grinding disc 110, a housing 120, a power module 10, a rectifier module 20, a capacitor circuit 30, a driving circuit 40, a brushless motor 50, and a controller 60.

The grinding disc 110 is installed at one end of the housing 120 and is driven by the brushless motor 50 to implement functions such as grinding or cutting.

The power module 10 is used to connect to a power source which is required for operation of the power tool. As a specific implementation, the power source in this example may be selected as an alternating current (AC) power source. The power module 10 may include an AC power plug to access 120V or 220 V AC mains power. The AC plug is arranged at the other end of the housing.

The rectifier module 20 constitutes a DC unit of the angle grinder, and is configured to receive the AC power from the power module 10 and output a direct current (DC) bus voltage, namely convert the AC power input from the power module 10 into a pulsating DC power output. The rectifier module 20 is electrically connected to the power module 10. Specifically, the rectifier module 20 may include a rectifier bridge composed of four diodes D1, D2, D3, and D4. The unidirectional conductivity of the diodes and the diode voltage drop are utilized to convert the AC power into a pulsating DC power output of the same direction.

The capacitor circuit 30 is connected in parallel to the DC bus of the angle grinder, that is, in parallel between the positive electrode and negative electrode of the DC unit in the circuitry of the angle grinder. Specifically, the capacitor circuit 30 may be connected in parallel between the rectifier module 20 and the driving circuit 40. In one example, the capacitor circuit 30 includes an electrolytic capacitor C and a power switch transistor Q that is connected in series with the electrolytic capacitor C.

The pulsating DC power output by the rectifier module 20 is filtered by the electrolytic capacitor C to be converted into a smooth DC output, thus reducing the harmonic interference in the pulsating DC power. The ratio of the electrolytic capacitor C to the rated power of the brushless motor can be selected from the range of 20 μF/kW~80 μF/kW. Using this capacitor circuit 30 can reduce the size of the power tool thus making it more compact in structure while satisfying the speed adjustment needs of the power tool.

The driving circuit 40 is electrically connected to the stator windings A, B, and C of the brushless motor 50 and is used for transmitting the DC power from the rectifier module 20 to the stator windings A, B, and C to drive the brushless motor 50. As an example, as shown in FIG. 1, the driving circuit 40 includes a plurality of switching elements Q1, Q2, Q3, Q4, Q5, and Q6, and the gate terminal of each of the switching elements is electrically connected to the controller 60 for receiving a control signal from the controller 60. The drain or source of each of the switching elements is connected to the stator windings A, B, and C of the brushless motor 50. As a specific example, the brushless motor 50 is a three-phase brushless motor, and the three-phase stator windings A, B, and C are connected in a delta or star shape. The switching elements Q1-Q6 receive control signals from the controller 60 to change their respective conducting states, thereby changing the currents loaded on the stator windings A, B, C of the brushless motor 50 by the power module 10.

In order to make the brushless motor 50 rotate, the driving circuit 40 may have a plurality of driving states. In one driving state, the stator windings of the motor may generate a magnetic field. The controller 60 outputs a corresponding PWM control signal to the switching elements in the driving circuit 40 based on the rotor position of the motor or the counter-electromotive force to cause the driving circuit 40 to switch its driving state, so that the stator windings generate a changing magnetic field to drive the rotor to rotate, thereby achieving the rotation or commutation of the brushless motor 50. It should be noted that any other circuit and control method capable of driving the rotation or commutation of the brushless motor 50 can be used in the present disclosure. This disclosure does not impose limitations on the circuit structure of the driving circuit 40, nor on the control of the driving circuit 40 by the controller 60.

Since the power module 10 of the power tool in this example is connected to the AC mains power, the voltage on the DC bus of the angle grinder may experience a drastic change at the moment of power-on. The sharply changing voltage will produce a large instantaneous current peak under the action of the electrolytic capacitor C. This current fluctuation will bring a large impact on the power supply side. Current spikes tend to trip the power supply and reduce the capacitor's life span.

In addition, power tools using such a power supply mode often have a large operating power. When the power tool is working under high power conditions, the ripple current flowing through the electrolytic capacitor C will become larger and so the electrolytic capacitor C is repeatedly charged and discharged, thereby increasing the amount of heat, causing potential harm to the power tool. For example, for an angle grinder with a rated power of 1200 W, when the operating power reaches more than 1000 W, the ripple current flowing through the electrolytic capacitor C will become larger than that at a light load (below 1000 W). At this time, it is usually necessary to select a larger electrolytic capacitor to meet the circuit's safety requirements.

In this example, the charging and discharging process of the electrolytic capacitor C can be controlled by a control unit constituted by a controller. Specifically, the control unit can restrict the charging and discharging durations of the electrolytic capacitor C to restrict the amounts of charge and discharge of the electrolytic capacitor C, so that the same smooth filtering effect is achieved by the electrolytic capacitor C with a small capacitance value, thereby avoiding the tripping threat posed to the power supply caused by the current spikes and solving the problem of sparks at power-on of the circuitry, In addition, because the current spikes are suppressed, the impact on the capacitor's service life can be avoided, thereby extending the life of the entire machine.

Figure 3:
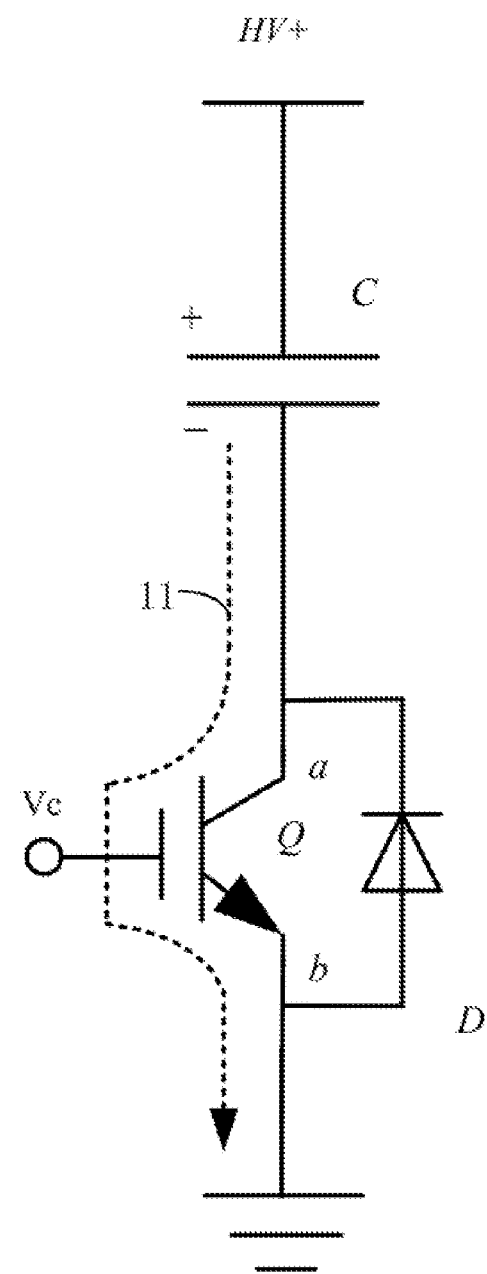
FIG. 3 is a circuit diagram of the capacitor circuit shown in FIG. 2 in a charging state.

For a specific structure of the capacitor circuit, see FIG. 3. FIG. 3 is a circuit diagram of the capacitor circuit 30 in a charging state. The capacitor circuit 30 includes an electrolytic capacitor C and a power switch transistor Q that is connected in series with the electrolytic capacitor C. The electrolytic capacitor C and the power switch transistor Q are connected in parallel on the DC bus of the power tool. As an example, one terminal of the capacitor C is connected to a high-voltage output terminal HV+, and the other terminal of the capacitor C is connected to a first electrode a of the power switch transistor Q. A second electrode b of the power switch transistor Q is connected to a low-voltage output terminal or to ground. A third electrode Vc of the power switch transistor Q is connected to the controller. As a possible implementation, an IGBT transistor (Insulated Gate Bipolar Transistor) can be selected as the power switch transistor Q herein. The base of the transistor is controlled by the controller, the emitter is grounded, and the collector is connected to the negative electrode of the electrolytic capacitor. The transistor works in a switching state, and is controlled by the controller to switch between on and off states to charge and discharge the electrolytic capacitor. Similar functions can also be implemented by those skilled in the art using field effect transistors.

Figure 4:
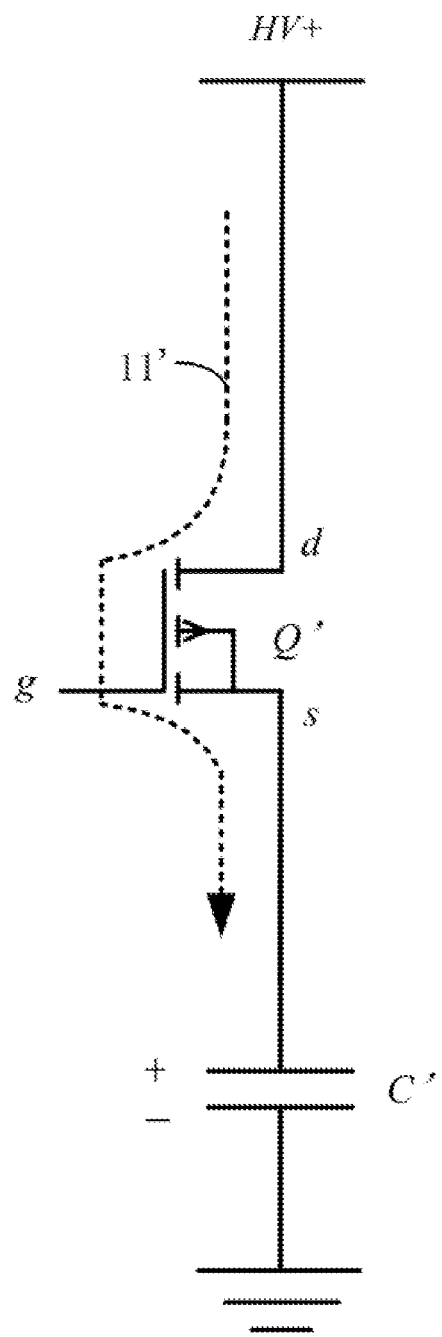
FIG. 4 is a circuit diagram of another capacitor circuit.

Turning now to FIG. 4, as another example, the power switch transistor Q' is selected as a field effect transistor (FET). The drain d of the FET is analogous to the first electrode a of the power switch transistor Q' in the above example, and is connected to a high voltage, that is, to the high-voltage output terminal HV+. The source s of the field-effect transistor is analogous to the second electrode b of the power switch transistor Q' in the above example, and is connected to a low voltage, and in this example, is correspondingly connected to an electrode of the capacitor C'. The gate g of the field effect transistor is analogous to the third electrode Vc of the power switch transistor Q' in the above example, and is connected to the controller. The negative electrode of the capacitor C' is connected to the low-voltage output terminal or ground.

From the foregoing implementations, those skilled in the art can appreciate that the function implemented by the power switch transistor Q is a control switch, which can be implemented by using hardware circuit elements enabled with switching function namely switching elements, such as MOSFET, IGBT, and thyristor. The power switch transistor Q is turned on or off under the control of the controller 60, and then controls the charge/discharge branch of the electrolytic capacitor C where it is located, so as to control the charge/discharge duration or amount of charge/discharge of the electrolytic capacitor C. Specifically, the power switch transistor Q can be controlled to be turned on or off by a software program written in the controller 60. It should be noted that the controller 60 may also implement the control over the power switch transistor Q in a hardware output manner by designing a related control circuitry, which will not be limited in the present disclosure.

The controller 60 is configured to send a PWM duty cycle signal to the power switch transistor Q when the plug of the angle grinder is powered up, so as to control the power switch transistor Q to be periodically turned on. During the conducting periods of the power switch transistor Q, the capacitor circuit is in a charging state. By controlling the on-durations of the PWM duty cycle signal, that is, restricting the duty cycle of the signal, charging durations and the amount of charge of the capacitor may be restricted, thereby achieving the purpose of slowly charging the capacitor. By slowly charging the capacitor C, the impact of the instantaneous current on the AC or DC power supply side on the power supply system such as a socket can be avoided.

Specifically, when the controller controls the power switch transistor Q to be turned on, the capacitor circuit is in a charging state. When the controller controls the power switch transistor Q to be turned off, the capacitor circuit is not in a charging state. When the controller controls the power switch transistor Q to be turned off, the capacitor circuit is in a charging or discharging state corresponding to the ripple current fluctuation condition of the DC bus.

Further, the controller 60 may be configured to turn on or gradually turn on the power switch transistor Q when the rotation speed of the brushless motor 50 reaches a first rotational speed so that the capacitor circuit 30 enters a charging state. Turning to FIG. 3, there is shown a circuit diagram of the capacitor circuit 30 in a charged state. The power tool is connected to a AC source. When the rotational speed of the brushless motor 50 reaches the first rotational speed, the controller 60 may output a PWM control signal to the power switch transistor Q to turn on the power switch transistor Q or gradually increase the on-times. At this time, the current flows through the electrolytic capacitor C and then flows in the direction indicated by the arrow 11 to form a current loop, and the capacitor circuit 30 is in a charging state. The controller 60 outputs a corresponding control signal to the driving circuit 40 so that the driving circuit 40 drives the brushless motor 50 to operate. As an implementation, the first rotational speed may be set to zero.

As such, when the rotational speed of the brushless motor 50 reaches the first rotational speed, the electrolytic capacitor C is electrically connected to the rectifier module 20 by turning on the power switch transistor Q. While providing the necessary starting torque for the power tool, a smooth voltage waveform is ensured, so that the motor can have a relatively stable output performance.

Figure 5:
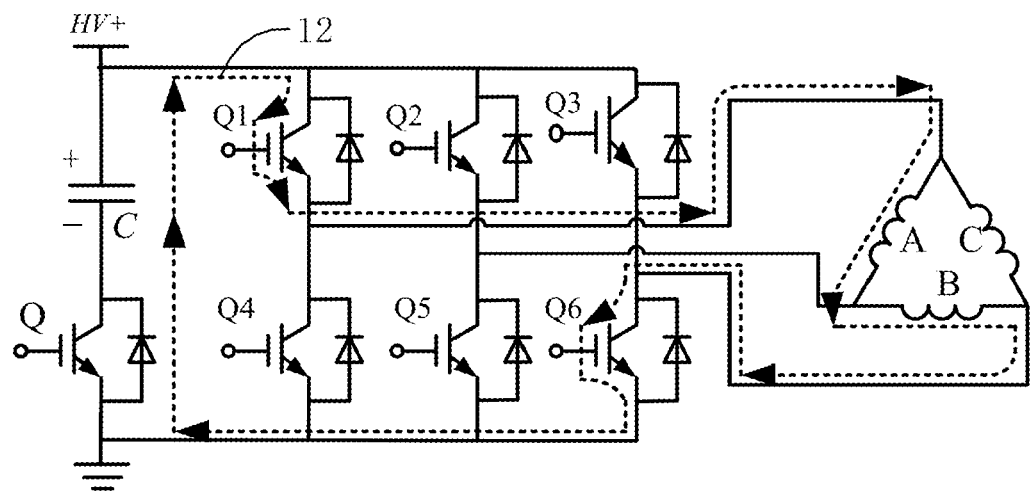
FIG. 5 is a schematic diagram illustrating the flow of current of the capacitor circuit in a discharging state in the first example provided by the present disclosure.

The controller 60 may be further configured to turn off the power switch transistor Q when the rotational speed of the brushless motor 50 reaches the second rotational speed so that the capacitor circuit 30 is in a discharging state. Turning to FIG. 5, there is shown a circuit diagram of the capacitor circuit 30 in a discharging state. When the rotational speed of the brushless motor 50 reaches the second rotational speed, the controller 60 may output a second control signal to the power switch transistor Q to turn off the power switch transistor Q. At this time, the current flows from the positive electrode of the electrolytic capacitor C in the direction indicated by the arrow 12 through the switching element, the stator windings A, B, C, and the diode in sequence to flow back to the negative electrode of the electrolytic capacitor C, and the capacitor circuit 30 is in a discharging state.

As such, when the rotational speed of the brushless motor 50 reaches the second rotational speed, the capacitor circuit 30 is not connected to the rectifier circuit by turning off the power switch transistor Q, thereby reducing the heating wear of the electrolytic capacitor C, extending the life of the capacitor circuit 30, and improving the reliability of the power tool.

It should be noted that the rotational speed of the brushless motor 50 may be detected by a separate rotational speed detection module, or the detection may alternatively be achieved by a detection unit integrated in the controller 60 through detection and computation. Any solution capable of obtaining the rotational speed of the brushless motor 50 can be used in the present disclosure, and therefore is not limited thereto.

As a specific implementation, the first rotational speed n1 is zero and the second rotational speed n2 lies in the range from 30% n0≤n2≤70% n0, where n0 is a gear rotational speed of the power tool. A power tool equipped with speed adjustment usually have a gear speed adjustment switch that has multiple gears. When the speed adjustment switch is put in different gear positions, the motor would correspondingly output different gear speeds, namely the gear speeds referred to herein.

As another specific implementation, the controller may also be configured to control the power switch transistor Q to be turned on and off depending on the temperature of the power switch transistor or the capacitor C. In the second example of the present disclosure, the above-mentioned control of the capacitor circuit can also be applied to a DC-powered power tool. The handheld circular saw illustrated in FIG. 6 is set as an example, and other DC-powered power tools are similar thereto.

Figure 6:
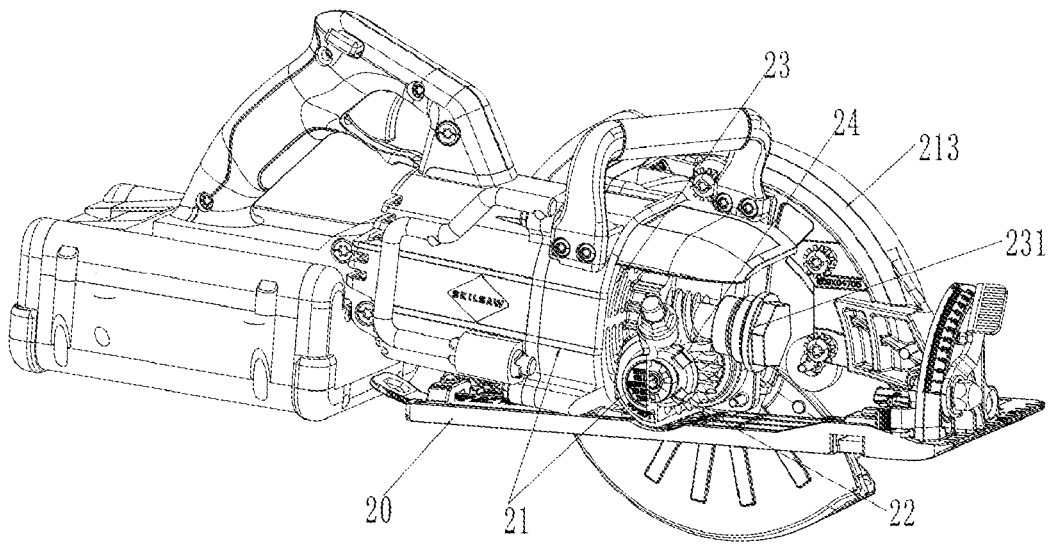
FIG. 6 is a schematic diagram illustrating a mechanical structure of a power tool in accordance with a second example provided by the present disclosure.

Taking the circular saw shown in FIG. 6, it includes: a bottom plate 20 for contacting a workpiece; a casing 21 mounted on the bottom plate; a saw blade cover 213 connected to the casing; a saw blade shaft 22 for supporting the rotation of the saw blade in the saw blade cover to realize a cutting operation of the workpiece; a motor 23 that is arranged in the casing and that includes a stator and a rotor; a motor shaft 231 that is driven by the rotor of the motor; a transmission device 24 that is used to connect the motor shaft to the saw blade shaft, thereby transmitting the rotary motion of the motor shaft to the saw blade shaft so as to drive the saw blade to rotate. The transmission device may specifically include a speed reduction mechanism, such as a gear and a worm that mesh with each other, or a reduction gear box. The worm gear or the reduction gear box may include gear structures equipped with different gear ratios, or synchronous belt transmission structures equipped with different synchronous wheel radii. In an exemplary implementation of the present disclosure, the motor may be selected as a brushless motor.

Figure 7:
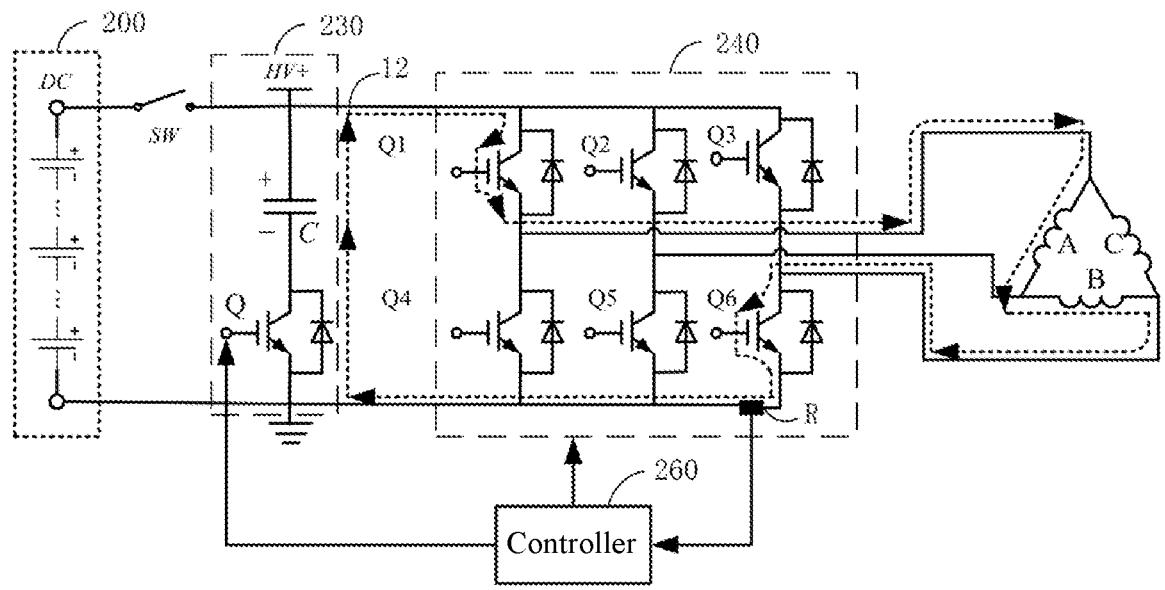
FIG. 7 is a circuit diagram of a capacitor circuit in a discharging state in accordance with the second example provided by the present disclosure.

The operation of the handheld circular saw also depends on the electronic components mounted on the PCB circuit board. The PCB circuit board is accommodated in the casing 21 and is not exposed to the viewing angle shown in FIG. 6. Turning now to FIG. 7, the PCB circuit board specifically includes the following circuit hardware: a power module 200, a motor sampling module R, a controller 260, a driving circuit 240, and a capacitor circuit 230 similar to the previous example. The circular saw here uses a battery pack as the power module. The capacitor circuit 230 is connected in parallel to the DC bus, namely in parallel between the positive electrode and the negative electrode of the DC unit in the circular saw circuit; that is, in parallel with the positive and negative electrodes of the DC power supply when the DC power supply such as a battery pack is used as the power supply. Specifically, the capacitor circuit 30 may be connected in parallel between the operating switch SW and the driving circuit 240.

The ignition sparks of the battery pack is similar to the process of powering on with a AC power in the previous example. When the battery pack is installed, namely when the DC power module is connected, the voltage on the DC bus of the power tool may undergo a drastic change at the instant of power-on. The sharply changing voltage will produce a large instantaneous current peak under the action of the electrolytic capacitor C. This current fluctuation will have a large impact on the power supply side, which specifically refers to the battery pack in this example.

Figure 8:
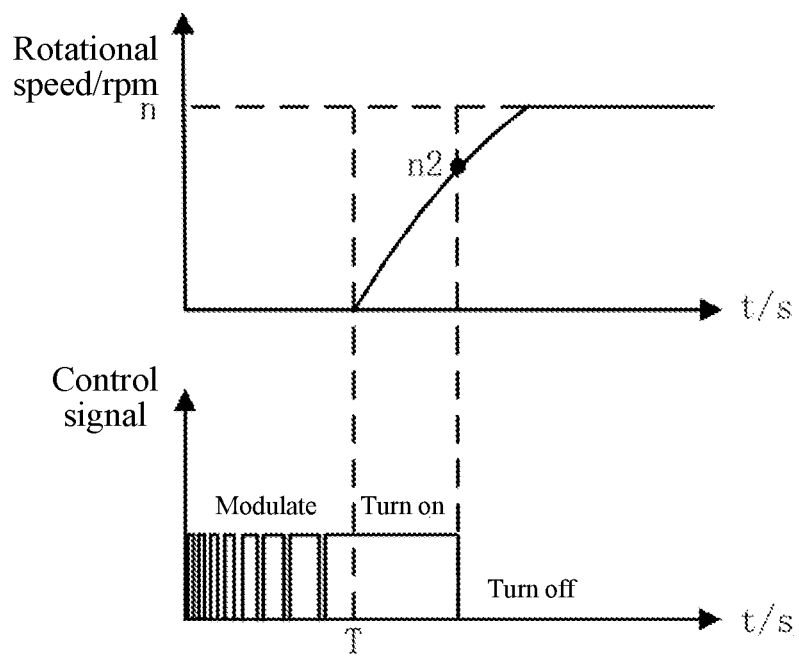
FIG. 8 is a schematic diagram of a curve depicting the rotational speed of the motor and a curve depicting the PWM control signal that is output by the controller to the power switch transistor, during the power-on startup process.

Therefore, similar to the control of the charging and discharging processes of the electrolytic capacitor in the previous example, it can also be applied to a DC-powered power tool. Turning to FIG. 8, which is a schematic diagram of a curve depicting the rotational speed of the motor and a curve depicting the PWM control signal that is output by the controller 260 to the power switch transistor Q, during the power-on startup process. In the figure, the abscissa represents time, and the ordinate represents the rotational speed of the motor and the PWM control signal coupled to the gate of the power switch transistor Q. When the power tool is coupled to a power source to be powered on, the controller 260 may output a PWM control signal with a gradually increased duty cycle to the gate of the power switch transistor Q to modulate the power switch transistor Q. At this stage, the speed of the motor is close to zero. After the power switch transistor Q is modulated for a preset duration, the controller 260 may output a fully-on PWM control signal to the gate of the power switch transistor to make the power switch transistor Q fully conductive. At this time, the rotational speed of the motor gradually increases, and when the rotational speed is greater than or equal to the second rotational speed n2, the controller 60 may output a control signal to the gate of the power switch transistor Q to turn off the power switch transistor Q.

Figure 9:
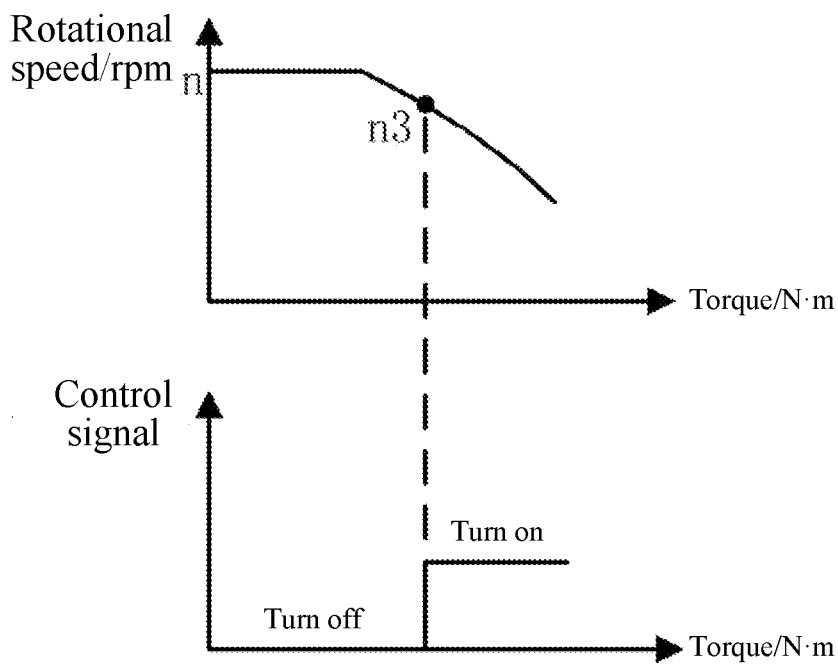
FIG. 9 is a schematic diagram of a curve depicting the rotational speed of the motor and a curve depicting the PWM control signal that is output by the controller to the power switch transistor during the loading process, in accordance with a first case.

Turning to FIG. 9, which is a schematic diagram of a curve depicting the rotational speed of the motor and a curve depicting the PWM control signal that is output by the controller 260 to the power switch transistor Q during the operating and loading process, in accordance with a first case. As the load on the power tool increases, the rotational speed of the motor gradually decreases with an increasing torque. When the rotational speed is less than or equal to the third rotational speed n3, the controller 260 may output a control signal to the gate of the power switch transistor Q to turn on the power switch transistor Q. The capacitor circuit 230 is in a charging state, and the electric energy stored in the electrolytic capacitor C is steadily loaded to the motor side, which gradually increase the power supply voltage for the motor, thereby ensuring the stability of the motor's output performance. Specifically, the third rotational speed n3 may assume a value that lies in the range of 80% n0≤n3≤100% n0.

Figure 10:
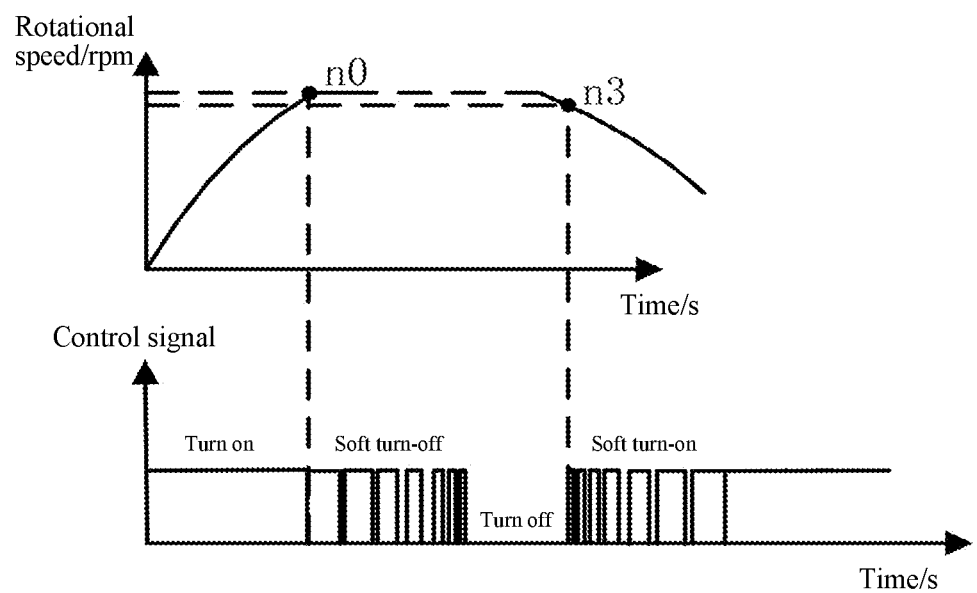
FIG. 10 is a schematic diagram of a curve depicting the rotational speed of the motor and a curve depicting the PWM control signal that is output by the controller to the power switch transistor during the loading process, in accordance with a second case.

Turning now to FIG. 10, in the above-mentioned working process of the power tool, the control of the charging and discharging of the electrolytic capacitor C can also be implemented in a "soft turn-on" or "soft turn-off" manner. The "soft turn-on" or "soft turn-off" specifically refers to gradually increasing or decreasing the times for turning on or turning off the electrolytic capacitor C branch by controlling the duty cycle of the PWM control signal, and more particularly by gradually increasing or decreasing the duty ratio. That is, the amount of charge or discharge of the electrolytic capacitor C is controlled by means of the duty ratio, so that the electrolytic capacitor C is slowly charged or discharged. Therefore, by controlling the electrolytic capacitor C to be slowly charged or discharged, the impact of the charging and discharging processes on the entire circuitry can be reduced. Thus, sudden changes in the rotational speed or vibrations of the power tool felt by the user that are caused by the impact of the capacitor's charging and discharging currents on the circuitry can be avoided during user's operations. This improves the user's feel of operation while ensuring that the power output of the power tool will not experience abrupt changes.

Referring to FIG. 10, which shows a curve depicting the rotational speed of the motor and a curve depicting the PWM control signal that is output by the controller to the power switch transistor Q, in accordance with one case. In the figure, the abscissa represents time, and the ordinate represents the rotational speed of the brushless motor and the PWM control signal coupled to the gate (i.e., the third electrode) of the power switch transistor. In the working process of the power tool, when the rotational speed reaches the gear rotational speed n0, the controller 260 outputs a PWM control signal with a gradually decreasing duty cycle to the gate of the power switch transistor to modulate the power switch transistor to achieve soft shutdown. As the load torque increases, the rotational speed decreases. When the rotational speed is less than or equal to the third rotational speed n3, the controller 60 outputs a PWM control signal with a gradually increased duty cycle to the gate of the power switch transistor to modulate the power switch transistor to achieve soft turn-on. Specifically, the third rotational speed n3 may assume a value that lies in the range of 80% n0≤n3≤100% n0. As such, the wear as well as the temperature of the power switch transistor can be reduced.

Optionally, when applied to a high-voltage brushless power tool product, the above-described control of the charging and discharging of an electrolytic capacitor can also be applied to a larger capacitor. For example, the ratio of the electrolytic capacitor C to the rated power of the brushless motor can be selected to be greater than 80 μF/kW.

Figure 11:
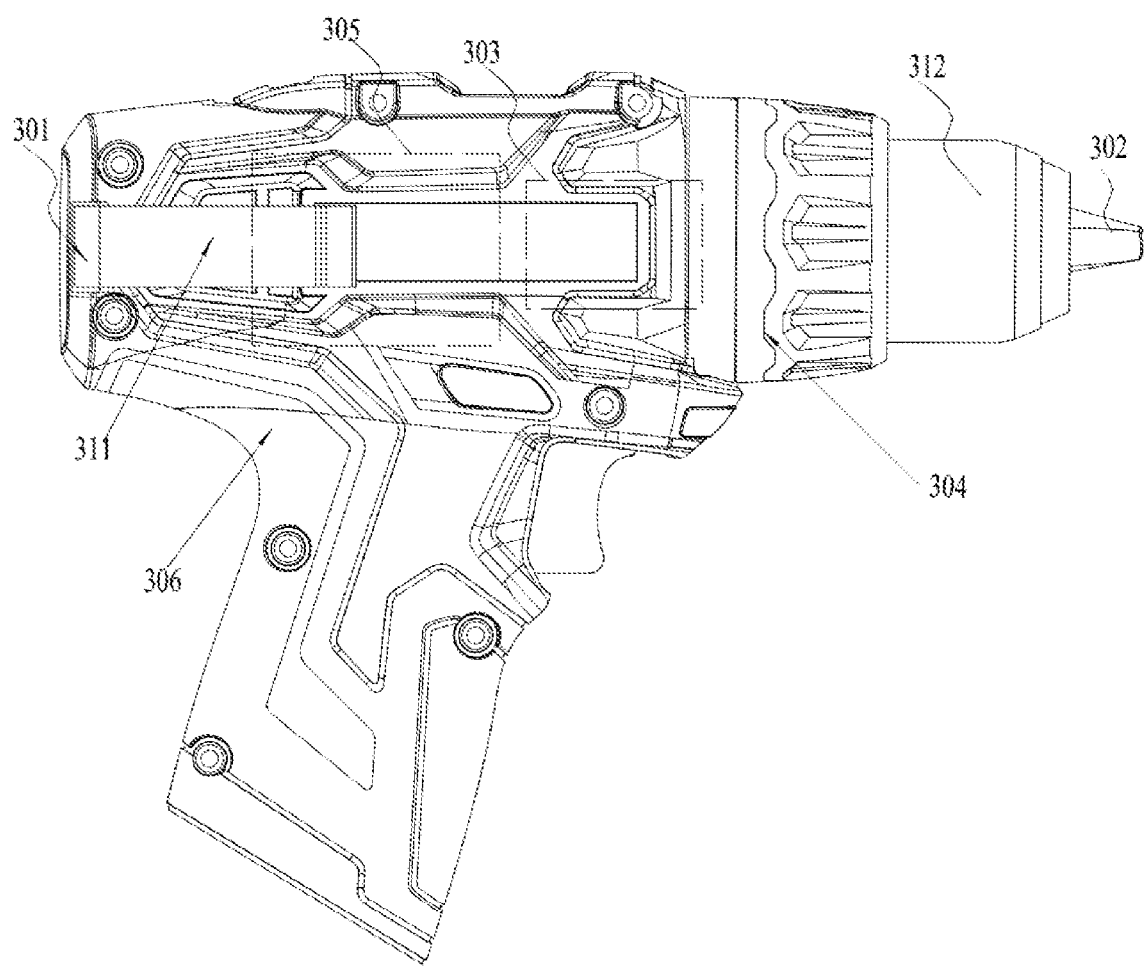
FIG. 11 is a schematic diagram illustrating a mechanical structure of a power drill in accordance with a third example provided by the present disclosure.

In the third example of the present disclosure, as illustrated in FIG. 11, there is provided a power drill having a mechanical structure that includes: a housing 301, an output member 302, a motor 303, a transmission assembly 304, and a PCB (Printed Circuit Board) 305, and a power supply device 306. The housing 301 is used to accommodate the motor 303, the transmission assembly 304, the PCB circuit board 305, and the like, where one end of the housing 301 is also used to install the output member 302. In the perspective illustrated in FIG. 11, the motor 303, the PCB circuit board 305, and the power supply device 306 are blocked by the housing 301 and are not directly exposed to the perspective of FIG. 11. In the front-rear orientation, the housing 301 may further include a main housing portion 311 and a head housing portion 312. The main housing portion 311 may be used to receive the motor 303, the transmission assembly 304, and the PCB circuit board 305, while the head housing portion 312 may be connected to the output member 302. In the left-right orientation, the main housing portion 311 may be symmetrically formed with respect to the cut plane of the structure shown in FIG. 11. On the two sides of the cut plane, the main housing portion 311 may include a left housing portion and a right housing portion that are symmetrical to each other. The output member 302 is used for outputting power. For example, regarding a power drill, the output member 302 may be specifically selected as a chuck capable of clamping a drill. The motor 303, the transmission assembly 304, and the PCB circuit board 305 may all be arranged in the housing 301. The power supply device 306 is used to supply power to the various electronic components inside the power drill. The PCB circuit board 305 is used to control the operation of the motor 303. The motor 303 is used to drive the transmission assembly 304. The transmission assembly 304 is used to transmit the power output from the motor 303 to the output member 302, so as to drive the output member 302 to further output a power.

To control the operation of the motor 303, as illustrated FIG. 2, the above-mentioned PCB circuit board 305 may be similar to that in the above example, and may include the following circuit hardware: a power supply control module, a control unit, a driving circuit, and a motor sampling module. The power supply control module, the control unit, the driving circuit, and the motor sampling module as described above are all enclosed by the housing 301.

The power supply device 306 of the handheld power drill shown in FIG. 2 may be specifically selected as a battery pack or an AC power source, where the battery pack may be composed of a group of battery cells. For example, in this example, the battery cells may be connected in series into a single power supply branch to form a 1P battery pack. The output voltage of the battery pack may be changed by a specific power control module such as a DC-DC module, thus outputting a power supply voltage suitable for the control unit, the driving circuit, the motor, etc. to power them up. Those having ordinary skill in the art will appreciate that the DC-DC module is a mature circuit structure and can be selected accordingly depending on the specific parameter requirements of the power tool. The power supply device 306 may also be selected as an AC power source. The input AC power is converted by a corresponding power supply control module, which can also supply power to the power supply device detection module, control unit, driving circuit, optimal duty cycle storage device, motor, etc.

Figure 12:
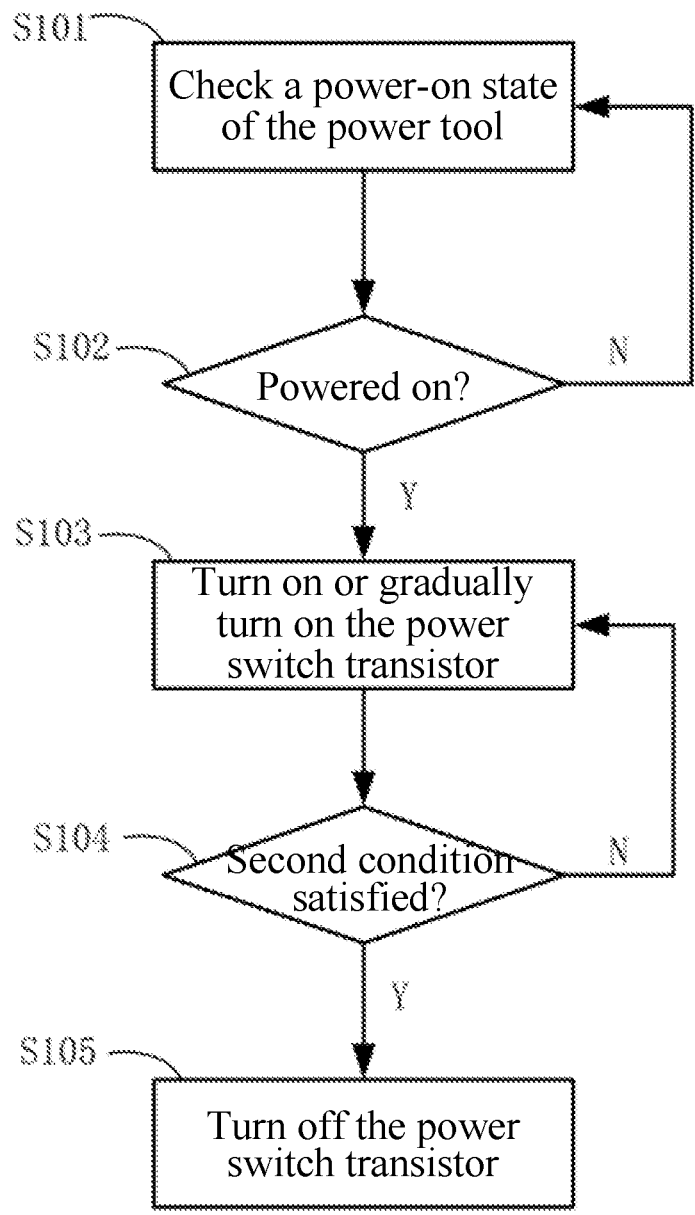
FIG. 12 is a flowchart illustrating a control method used for a power drill.

The circuit structure of the power drill is similar to that of the angle grinder or circular saw described in the above example, and so is not detailed herein again. The control unit may specifically control the operation of the power drill through the following steps and procedures. With reference to FIG. 12, there is provided a control method that is used in a power tool such as a power drill and that includes the following steps.

In S101, the power-on state of the power tool is checked.

In S102, if it is determined that the power tool is powered on, go to step S103, otherwise return to S101.

In S102, the power switch transistor Q is turned on or gradually turned on, where the capacitor circuit 30 is in a charging state at this time.

S104, determination is made as to whether a second condition is reached. If the second condition is reached, go to step S105, otherwise return to S103. The second condition includes, but is not limited to: whether a characteristic parameter related to the rotational speed of the brushless motor is satisfied, whether the temperature of the power switch transistor Q or the capacitor C has reached the threshold H, and whether the power switch transistor Q has been modulated for a preset length of time T, and so on. The characteristic parameter related to the rotational speed of the brushless motor may include the rotational speed of the motor in the power tool, for example, whether the rotational speed of the motor in the power tool has reached the second rotational speed n2. The characteristic parameter may also include a current, voltage, or rotor position signal related to the rotational speed of the motor in the power tool.

In S105, the power switch transistor Q is turned off or gradually turned off; at this point, the capacitor circuit 30 is in a discharging state, or the capacitor circuit 30 is in a charging or discharging state corresponding to the fluctuation of the ripple current of the DC bus.

In the above description, "gradually turning on" means gradually increasing the duty cycle of the PWM control signal output to the power switch transistor Q so as to gradually increase the on-times of the power switch transistor Q until the power switch transistor Q is fully turned on. Similarly, "gradually turning off" means gradually reducing the duty cycle of the PWM control signal output to the power switch transistor Q, thereby gradually reducing the on-times of the power switch transistor Q until the power switch transistor Q is completely turned off.

In S102, the motor corresponds to a first rotational speed, which may be zero. S103 may also be divided into two sub-steps. When the power tool is powered on, the power switch transistor Q is turned on with a gradually increasing duty ratio. After the power tool has been powered up for a preset length of time or the motor has reached a relatively small preset speed, the power switch transistor Q is fully turned on.

Figure 13:
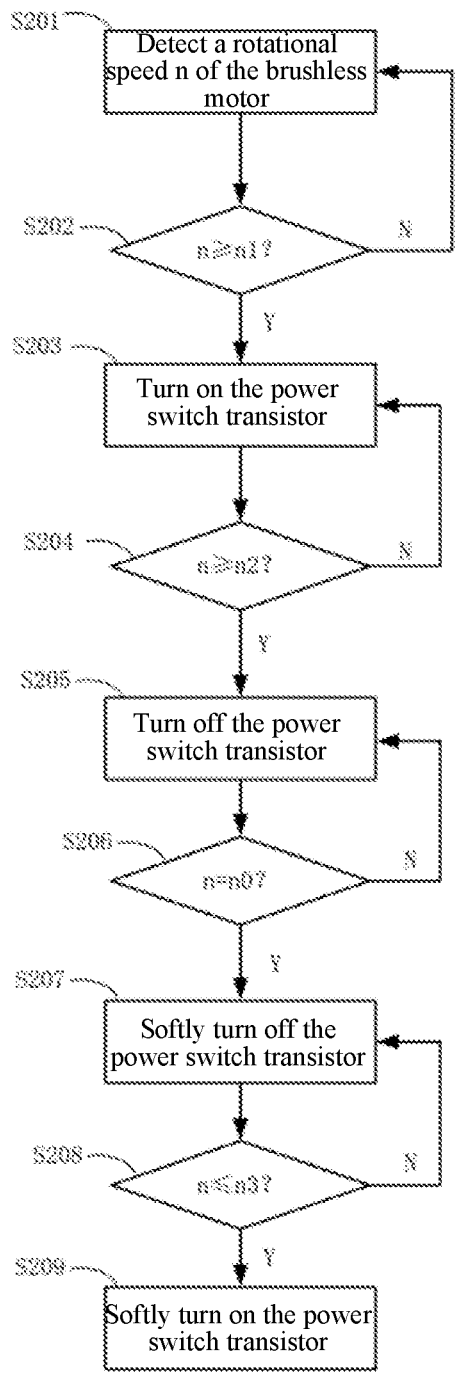
FIG. 13 is a flowchart illustrating another control method used for a power drill.

With reference to FIG. 13, there is provided another control method that is used in a power tool such as a power drill and that includes the following steps.

In S201, the rotational speed n of the motor is detected. The rotational speed n of the motor may be detected using a rotational speed detection module built into the power tool. The rotational speed detection module may be selected as a position sensor that detects the rotor of the motor, such as a Hall element, a carbon brush, a commutator, etc. It may also be selected as a current and/or voltage sampling element set on the phase line and/or bus of the motor, such as a sampling resistor R, which may work together with a corresponding motor position computation module to detect the rotational speed of the motor.

In S202, a determination is made as to whether the rotational speed n of the brushless motor is greater than or equal to a first rotational speed n1. If it is greater, then turn to step S203, otherwise turn to step S201.

In S203, if the rotational speed of the brushless motor n≥n1, then power switch transistor is turned on.

When the rotational speed of the brushless motor is greater than or equal to the first rotational speed n1, the controller may output a first control signal for turning on the power switch transistor to the power switch transistor, so as to turn on the power switch transistor. The first control signal is specifically a first PWM signal. Optionally, the duty ratio of the first PWM signal is gradually increased.

In S204, a determination is made as to whether the rotational speed n of the brushless motor is greater than or equal to a first rotational speed n2. If it is greater, then turn to step S205, otherwise turn to step S203.

In S205, if the rotational speed of the brushless motor n≥n2, then power switch transistor is turned off.

When the rotational speed of the brushless motor is greater than or equal to the second rotational speed n2, the controller may output a second control signal for turning off the power switch transistor to the power switch transistor, so as to turn off the power switch transistor. The second control signal is specifically a second PWM signal. Optionally, the duty ratio of the second PWM signal is gradually reduced.

In S206, a determination is made as to whether the rotational speed of the brushless motor reaches a gear rotational speed n0. If it has reached, then turn to step S207, otherwise turn to step S205.

In S207, if the rotational speed of the brushless motor is the gear rotational speed, then the power switch transistor is softly turned off.

When the rotational speed of the brushless motor is the gear rotational speed, the controller may output a control signal for softly turning off the power switch transistor to the power switch transistor, so as to softly turn off the power switch transistor.

In S208, a determination is made as to whether the rotational speed of the brushless motor is less than or equal to a third rotational speed. If it is less than or equal to the third rotational speed, then go to step S209, otherwise turn to step S207.

In S209, if the rotational speed of the brushless motor is less than or equal to the third rotational speed, the power switch transistor is softly turned on.

When the rotational speed of the brushless motor is less than or equal to the third rotational speed, the controller may output a control signal for softly turning on the power switch transistor to the power switch transistor, so as to softly turn on the power switch transistor.

The first rotational speed n1 may take the value range of $0 \leq n1 < n2$, and the second speed n2 may take the value range of $30\% \, n0 \leq n2 \leq 70\% \, n0$, where n0 is the gear rotational speed of the power tool, and the third rotational speed may take the value range of $n3 \, 80\% \, n0 \leq n3 \leq 100\% \, n0$.

The power tool in the present disclosure may also be a power tool equipped with a speed adjustment function, such as an electric drill, an electric hammer, an electric circular saw, and a marble cutting machine, thereby preventing the impact of the power-on process on the power supply side, avoiding power-on sparks, and avoiding sudden changes in the motor speed during operation, maintaining a good feel of operating the power tool.

Figure 14:
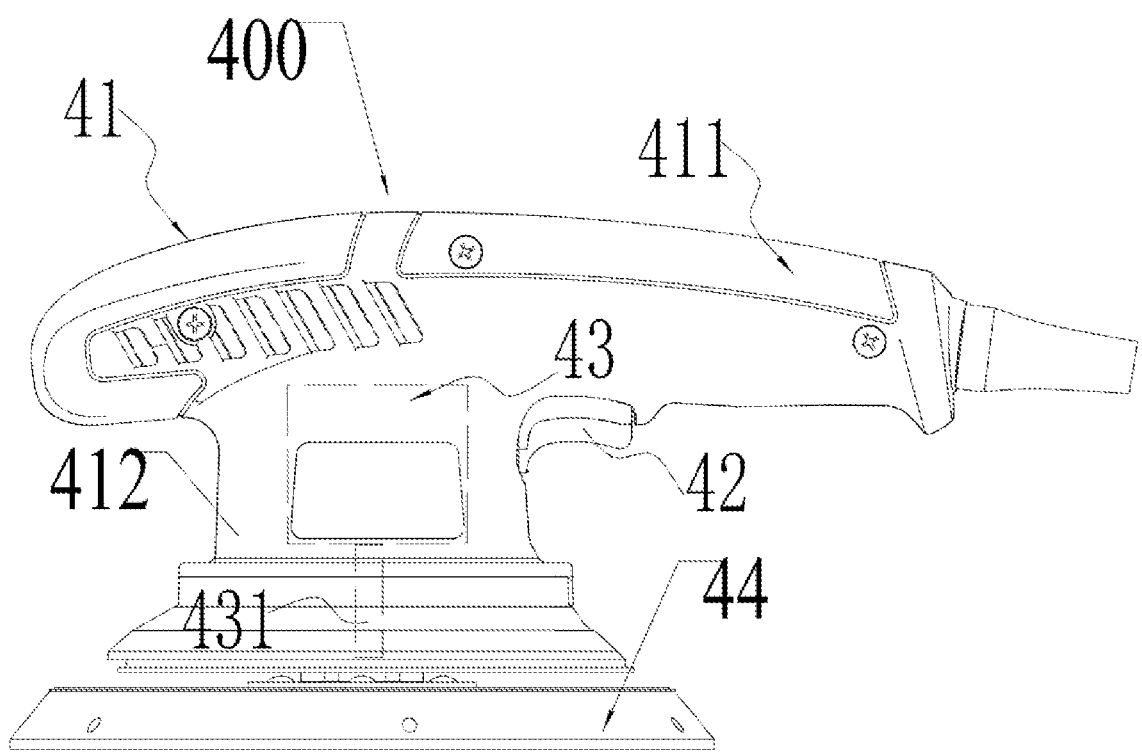
FIG. 14 is a schematic diagram illustrating a mechanical structure of a polishing machine in accordance with a fourth example provided by the present disclosure.

In the fourth example of the present disclosure, reference is made to a polishing tool provided in FIG. 14 such as a polishing machine. Its mechanical structure includes the following components.

The housing 41 is used to receive various components in the polishing machine 400. The housing 41 may include a handle portion 411 and a receiving portion 412. The handle portion 411 is used to be held by a user, and the receiving portion 412 forms a receiving space for receiving the various components. A switch 42 may be mounted on the handle portion 411. When the user holds the handle portion 411, the switch 42 may be triggered relatively conveniently. The switch 42 may be, for example, a trigger for starting the polishing machine 400.

The receiving portion 412 of the housing 41 houses the motor 43. The motor 43 is used to convert energy provided by an energy source, such as an AC power source, into a power output. The motor 43 is connected to a motor shaft 431, and one end of the motor shaft 431 is connected to a transmission device to output power.

The bottom plate 44 is used to install a sandpaper, and is connected to a tool accessory shaft. The tool accessory shaft is connected to the transmission device. Driven by the motor 43 and under the actions of the motor shaft, the transmission device, and the tool accessory shaft, the bottom plate 44 may be driven by the motor to perform a reciprocating or oscillating motion. When the bottom plate 44 reciprocates or oscillates, the bottom plate 44 drives the sandpaper to continuously rub on the surface of the workpiece, thereby realizing functions such as grinding and polishing the workpiece.

The above-mentioned grinding tools can also rely on the electronic components disclosed in the foregoing examples to realize the driving and control of the motor. For example, in a DC-powered polishing tool, the electronic components may include a power module mainly composed of a battery pack, a capacitor circuit and a driving circuit that connected in parallel to its output terminals, and a control unit. In an AC-powered polishing tool, the electronic component may include a rectifier module, a capacitor circuit, a driving circuit, and a control unit.

The control unit may refer to the steps described in the third example to control the capacitor C in the capacitor circuit to perform charging or discharging accordingly. Specifically, the control unit may control the power switch transistor Q connected in series with the capacitor C to be turned on or off, thereby controlling the capacitor C in the capacitor circuit to be charged or discharged correspondingly. In particular, the control unit may control the capacitor C to be charged or discharged correspondingly by outputting a PWM signal with a changed duty cycle, so as to control the times or amounts of charge or discharge of the capacitor C, thereby realizing slow charging or slow discharging of the capacitor.

For example, the power-on state of the power tool is first checked, and when the power tool is powered on, the power switch transistor Q is turned on or gradually turned on, and at this point the capacitor circuit 30 is in a charging state; otherwise, continue to check whether the power tool is powered on.

Then it is determined whether the second condition is reached, and if second condition is reached, the power switch transistor Q may be turned off or gradually turned off, so that the capacitor circuit 30 enters a discharging state, or the capacitor circuit 30 may be correspondingly charged or discharged along with the fluctuation of the ripple current of the DC bus. If the second condition is not reached, the power switch transistor Q is kept on or gradually turned on.

The second condition includes, but is not limited to, whether the rotational speed of the motor in the power tool has reached the second rotational speed n2, whether the temperature of the power switch transistor Q or the capacitor C has reached a threshold H, and whether the power switch transistor Q has been modulated for a preset length of time T.

For example, a Hall element may be used to sample and calculate the working current of the motor to obtain the rotational speed of the motor. When the rotational speed of the motor in the power tool reaches the second rotational speed n2, it is determined that the second condition is reached. At this time, the power switch transistor Q is turned off or gradually turned off, so that the capacitor circuit 30 enters a discharging state, or the capacitor circuit 30 enters a charging or discharging state along with the fluctuation of the ripple current of the DC bus. Alternatively, a thermal element may be used to detect the surface temperature of the capacitor C, and when the temperature of the capacitor C exceeds a preset threshold H, it is determined that the second condition is reached, and accordingly the power switch transistor Q is turned off or gradually turned off. Alternatively, a timing interrupt may be added into the control unit to record the time under complex control (such as in the state of speed adjustment or modulating the power switch transistor Q with a PWM duty cycle). When the predetermined time T is exceeded, it is determined that the second condition is reached, and accordingly the power switch transistor Q is turned off or gradually turned off.

Therefore, by responding to the power-on state of the power tool, the impact on the power supply during the power-on process can be reduced, and in particular, the instantaneous current peak at the instant of power-on can be reduced. By controlling the capacitor to charge slowly during the power-on process, the protection of the power tool and its power source can be achieved with a relatively small capacitor, making the power tool more compact in structure and reducing its circuit hardware costs.

Through the control with the second condition, the capacitor can be controlled to be slowly discharged, thereby reduce the impact of the charging and discharging processes of the capacitor on the entire circuitry. Thus, sudden changes in the rotational speed or vibrations of the power tool felt by the user that are caused by the impact of the capacitor's charging and discharging currents on the circuitry can be avoided during user's operations. This improves the user's operating feel and ensures that the power output of the power tool will not by subject to abrupt changes.

Those having ordinary skill in the art should understand that the second condition here is independent of the power-on state or the first rotational of the power tool. That is, in one implementation of the present disclosure, regardless of whether the power tool is powered on or whether the power tool has a first rotational speed, the power switch transistor Q can be turned off or gradually turned off accordingly by determining whether the electric tool has reached the second condition. For example, when the second condition is that the rotational speed of the motor has reached the second rotational speed, then the determination of whether the motor has reached the second rotational speed can be made independently, without considering whether the power tool is powered on or whether the first rotational speed is satisfied, and then the control unit may a PWM duty cycle signal to control the switching element such as the power switch transistor Q to be turned off or gradually turned off, so that the capacitor circuit enters a discharging state.

The basic principles, main features, and advantages of the present disclosure have been shown and described above. Those having ordinary skill in the art will appreciate that the foregoing examples do not limit the disclosure in any form, and that any technical solution obtained by means of equivalent replacement or equivalent transformation shall all fall in the scope of protection of the disclosure.

The present disclosure provides a power tool, which can buffer the impact on the power supply side of the power tool by controlling the charging or discharging process of the capacitor, making the electric tool compact in structure.

What is claimed is:

1. A power tool, comprising:
a motor, comprising a stator and a rotor;
a transmission device, operably connected to the rotor and configured to output a power to drive a tool accessory;
a driving circuit, configured to output an on-off signal to drive the rotor of the motor to operate;
a control unit, configured to output a driving signal to control the driving circuit;
a rectifier module, configured to convert an alternating current (AC) power to a direct current (DC) power to power up the motor, the driving circuit, and the control unit; and
a capacitor circuit, connected between the rectifier module and the driving circuit;
wherein the capacitor circuit comprises a capacitor C and a power switch transistor Q that are connected in series; and the control unit is electrically connected to the power switch transistor Q and is configured to output a pulse width modulation (PWM) duty cycle signal depending on a characteristic parameter related to a rotational speed of the motor to control the power switch transistor Q to be turned on and off.

2. The power tool as recited in claim 1, wherein when the power switch transistor Q is turned off, a duty ratio of the PWM duty cycle signal is gradually reduced.

3. The power tool as recited in claim 2, wherein the control unit is configured to output a PWM duty cycle signal depending on the characteristic parameter related to the rotational speed of the motor to control the power switch transistor Q to be turned on and off and is configured to output a PWM duty cycle signal to turn on the switching element in response to the rotational speed of the motor reaching a first rotational speed, causing the capacitor circuit to enter a charging state.

4. The power tool as recited in claim 1, wherein the capacitor is an electrolytic capacitor, and a ratio of a capacitance value of the electrolytic capacitor to a rated power of the motor lies in the range of 20 μμF/kW to 80 μμF/kW.

5. An angle grinder, comprising:
a motor, comprising a stator and a rotor;
a transmission device, operably connected to the rotor and configured to output a power to drive a grinding disc;
a driving circuit, configured to output an on-off signal to drive the rotor of the motor to operate;
a control unit, configured to output a driving signal to control the driving circuit;
a rectifier module, configured to convert an alternating current (AC) power to a direct current (DC) power to power up the motor, the driving circuit, and the control unit; and
a capacitor circuit, connected between the rectifier module and the driving circuit;
wherein the capacitor circuit comprises a capacitor C and a power switch transistor Q that are connected in series;
and the control unit is electrically connected to the power switch transistor Q, and is configured to output a pulse width modulation (PWM) duty cycle signal depending on a rotational speed of the motor to control the power switch transistor Q to be turned on, and is configured to output a PWM duty cycle signal in response to the rotational speed of the motor reaching a first rotational speed to control the power switch transistor Q to be turned on, causing the capacitor circuit to enter a charging state.

6. The angle grinder as recited in claim 5, wherein when the power switch transistor Q is turned on, a duty ratio of the duty cycle signal is gradually increased.

7. The angle grinder as recited in claim 5, wherein the capacitor C is an electrolytic capacitor, and a ratio of a capacitance value of the electrolytic capacitor to a rated power of the motor lies in the range of 20 μF/kW to 80 μF/kW.

8. A power tool, comprising:
a brushless motor, comprising a stator and a rotor;
a transmission device, operably connected to the rotor and configured to output a power to drive a tool accessory;
a driving circuit, configured to output an on-off signal to drive the rotor of the brushless motor to operate;
a control unit, configured to output a driving signal to control the driving circuit;

a direct current (DC) unit, configured to supply power to the brushless motor, the driving circuit, and the control unit; and a capacitor circuit, connected in parallel between a positive electrode and a negative electrode of the DC unit;

wherein the capacitor circuit comprises a capacitor C and a switching element that are connected in series;

and the control unit is electrically connected to the switching element, and is configured to output a pulse width modulation (PWM) duty cycle signal depending on a rotational speed of the brushless motor to control the switching element to be turned on, and is configured to output a PWM duty cycle signal in response to the rotational speed of the brushless motor reaching a first rotational speed to control the switching element to be turned on, causing the capacitor circuit to enter a charging state.

9. The power tool as recited in claim 8, wherein the control unit is configured to output a PWM duty signal to turn on the switching element in response to the rotational speed of the brushless motor reaching the first rotational speed, causing the capacitor circuit to enter a charging state, and output a PWM duty signal to turn off the switching element in response to the rotational speed of the brushless motor reaching a second rotational speed, causing the capacitor circuit to enter a discharging state, wherein the first rotational speed is less than the second rotational speed.

10. The power tool as recited in claim 8, wherein the DC unit comprises a rectifier module that is at least operative to couple to an alternating current (AC) power source and that is configured to convert the AC power into a DC power.

11. The power tool as recited in claim 8, wherein the capacitor circuit is connected between the rectifier module and the driving circuit.

12. An angle grinder, comprising:
a housing;
a brushless motor, received in the housing and comprising a stator and a rotor;
a motor shaft, driven by the rotor;
a tool accessory shaft, configured to support and drive a grinding disc;
a transmission device, configured to couple the motor shaft to the tool accessory shaft;
a driving circuit, configured to output an on-off signal to drive the rotor of the brushless motor to operate;
a control unit, configured to output a driving signal to control the driving circuit;
a direct current (DC) unit, configured to supply power to the brushless motor, the driving circuit, and the control unit; and
a capacitor circuit, connected in parallel between a positive electrode and a negative electrode of the DC unit;
wherein the capacitor circuit comprises a capacitor C and a power switch transistor Q that are connected in series;
and the control unit is electrically connected to the power switch transistor Q, and is configured to: output a pulse width modulation (PWM) duty cycle signal depending on a rotational speed of the brushless motor, and output a PWM duty cycle signal in response to the rotational speed of the brushless motor reaching a first rotational speed, to control the power switch transistor Q to be turned on, causing the capacitor circuit to enter a charging state; and in response to the rotational speed of the brushless motor reaching a second rotational speed, output a PWM duty cycle signal to turn off the power switch transistor Q, causing the capacitor circuit to enter a discharging state, wherein the first rotational speed is less than the second rotational speed.

13. The angle grinder as recited in claim 12, wherein when the power switch transistor Q is turned on, a duty ratio of the PWM duty cycle signal is gradually increased.

14. The angle grinder as recited in claim 12, wherein when the power switch transistor Q is turned off, a duty ratio of the PWM duty cycle signal is gradually reduced.

15. The angle grinder as recited in claim 12, wherein the capacitor C is an electrolytic capacitor, and a ratio of a capacitance value of the electrolytic capacitor to a rated power of the brushless motor lies in the range of 20 μF/kW to 80 μF/kW.

* * * * *